L. H. LARSON.
COW STALL ATTACHMENT.
APPLICATION FILED MAY 2, 1911.
1,050,958.
Patented Jan. 21, 1913.
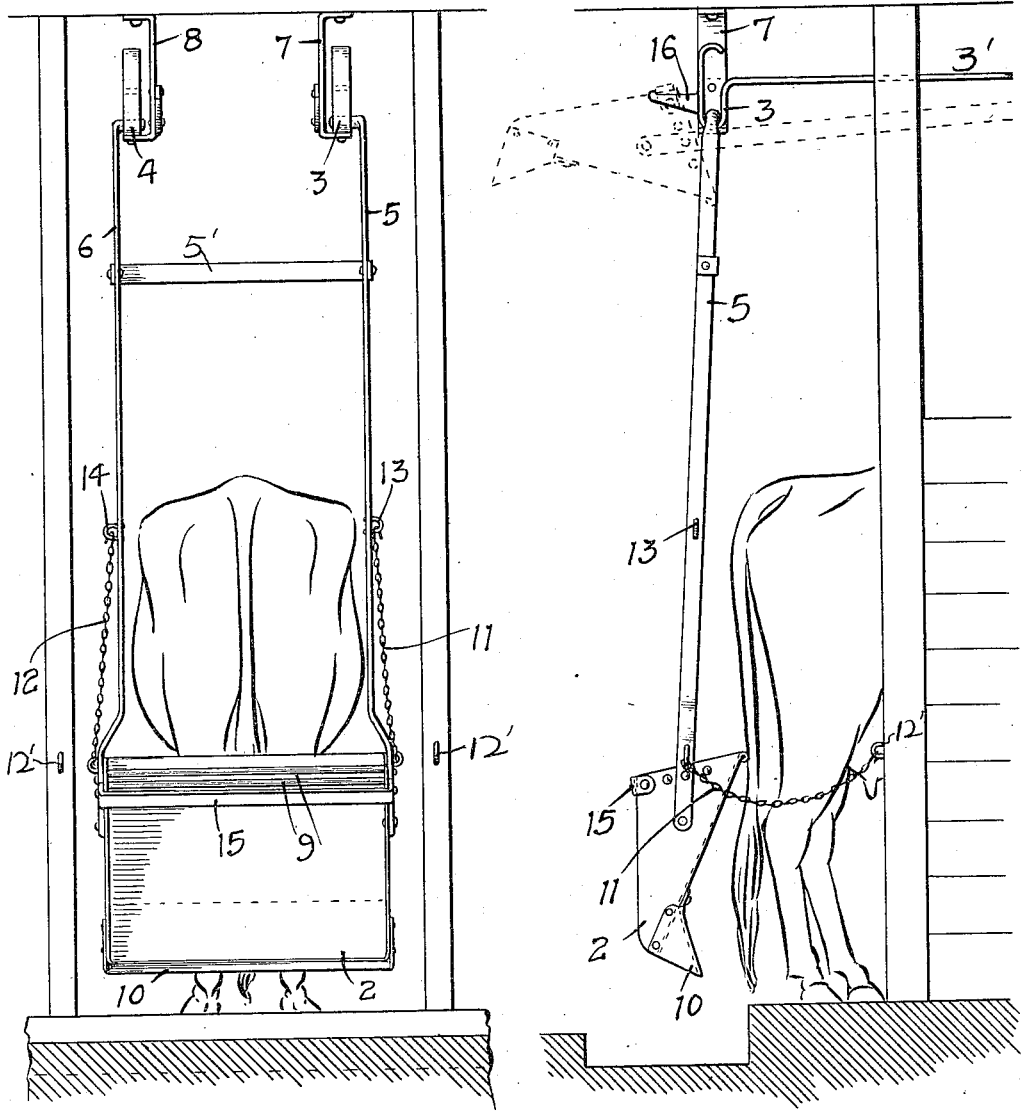
Fig 1.
Fig 2.
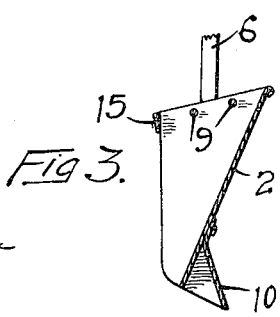
Fig 3.
WITNESSES
INVENTOR
LOUIS H. LARSON
BY
ATTORNEYS

UNITED STATES PATENT OFFICE.

LOUIS H. LARSON, OF SANTIAGO, MINNESOTA.

COW-STALL ATTACHMENT.

1,050,958.     Specification of Letters Patent.     Patented Jan. 21, 1913.

Application filed May 2, 1911. Serial No. 624,525.

*To all whom it may concern:*

Be it known that I, LOUIS H. LARSON, of Santiago, Sherburne county, Minnesota, have invented certain new and useful Improvements in Cow-Stall Attachments, of which the following is a specification.

The object of my invention is to provide a simple device by means of which the droppings of the animal will be conveyed to the trough at the rear of the stall and not deposited on the floor of the stall itself, as is usually the case when the cow steps forward to feed.

My device is especially adapted for dairy barns where the cleanliness of the cows is one of the first requisites.

A further object is to provide a device that will serve the required purpose and still permit the cow to move forward or backward at will.

Another object is to provide a device that can be easily adjusted, cleaned and raised out of the way when it is necessary to back the animal out of the stall.

Other objects of the invention will appear from the following detailed description.

The invention consists generally in a spout suspended at a suitable angle at the rear of the animal, at a proper height above the floor.

In the accompanying drawings forming part of this specification, Figure 1 is a rear view showing the device in position behind the cow, Fig. 2 is a side view, the dotted line showing the position when it is desired to raise the device out of the way. Fig. 3 is a detail view of the spout or chute.

In the drawing, 2 represents a swinging spout, preferably of sheet metal pivotally suspended from hooks 3 and 4 by means of rods 5 and 6, which are riveted on the sides of the spout. The hooks 3 and 4 form continuations of horizontal rails 3' which extend lengthwise of the stall. The rods 5 and 6 are preferably connected by a cross-bar 5'. This cross bar is provided between the bars 5 and 6 for the purpose of holding the bars in parallel relation and preventing the spout from twisting or swinging out of its operative position. Each hook has a long shank which is fastened by suitable means to the posts of the stall, while each hook receives additional support from suitable braces 7 and 8.

As shown in Fig. 2 the hook is so constructed that in order to disengage the supporting rods of the spout it is necessary to raise them upward and forward, thus giving additional security to the swinging spout. The center of gravity of the spout is so arranged that the spout keeps in contact with the rear of the cow and swings forward as the cow moves forward in her stall. To prevent the cow's tail from resting in the spout and thus becoming soiled, I place wires or light metal bars 9 across the top of the spout. A lip 10 is preferably provided at the lower end of the spout in position to bear on the cow's tail near the rump and prevent the cow from switching her tail while lying down. I also provide chains 11 and 12 which are fastened to each side of the spout and which may be hooked into staples 12' on each side of the stall, if it is desired to dispense with the usual head tying means. When these chains are not in use they may be hooked into rings 13 and 14 on the rods 5 and 6. On the spout 2 there is preferably a cross piece 15. This serves to strengthen the spout and when it is necessary to back the cow out of the stall, the supporting rods of the spout may be disengaged from the hooks, slid along the rails 3' and the spout and rods may thus be supported above the stall in a horizontal position, the cross piece 15 resting on a projecting bracket 16.

I claim is my invention:

1. A cow stall attachment comprising a spout having receiving and discharge ends and adapted to direct the droppings upon the floor in the rear of the stall, rods pivotally supported at their upper ends above the stall and depending to a point in the rear of the animal standing in the stall, the lower ends of said rods being secured to said spout, the pivotal supports of said rods causing the spout to swing by gravity toward the animal in the stall, the pivots of said rods allowing said spout and rods to be raised to a horizontal position above the stall, rails whereon said rods are adapted to slide when the spout is raised toward the forward portion of the stall, and means supporting said spout and rods in their raised position.

2. A cow stall attachment, comprising a spout having open ends, means pivotally supporting said spout at the rear of the animal standing in the stall, and a downwardly and forwardly projecting lip provided at the lower end of said spout.

3. A cow stall attachment comprising a spout having receiving and discharge ends and adapted to direct the droppings upon the floor in the rear of the stall, rods secured at their lower ends to said spout, hooks whereon said rods are pivotally supported, said rods and spout being adapted to be raised to a substantially horizontal position above the stall, said spout having a cross piece thereon, and a bracket near said hooks whereon said cross piece and spout are supported.

In witness whereof, I have hereunto set my hand this 28" day of April 1911.

LOUIS H. LARSON.

Witnesses:
GENEVIEVE E. SORENSEN,
EDWARD A. PAUL.

Copies of this patent may be obtained for five cents each, by addressing the "Commissioner of Patents, Washington, D. C."